Feb. 17, 1931.  C. R. BUTLER  1,793,051
MICROADJUSTING DEVICE
Filed Oct. 11, 1922
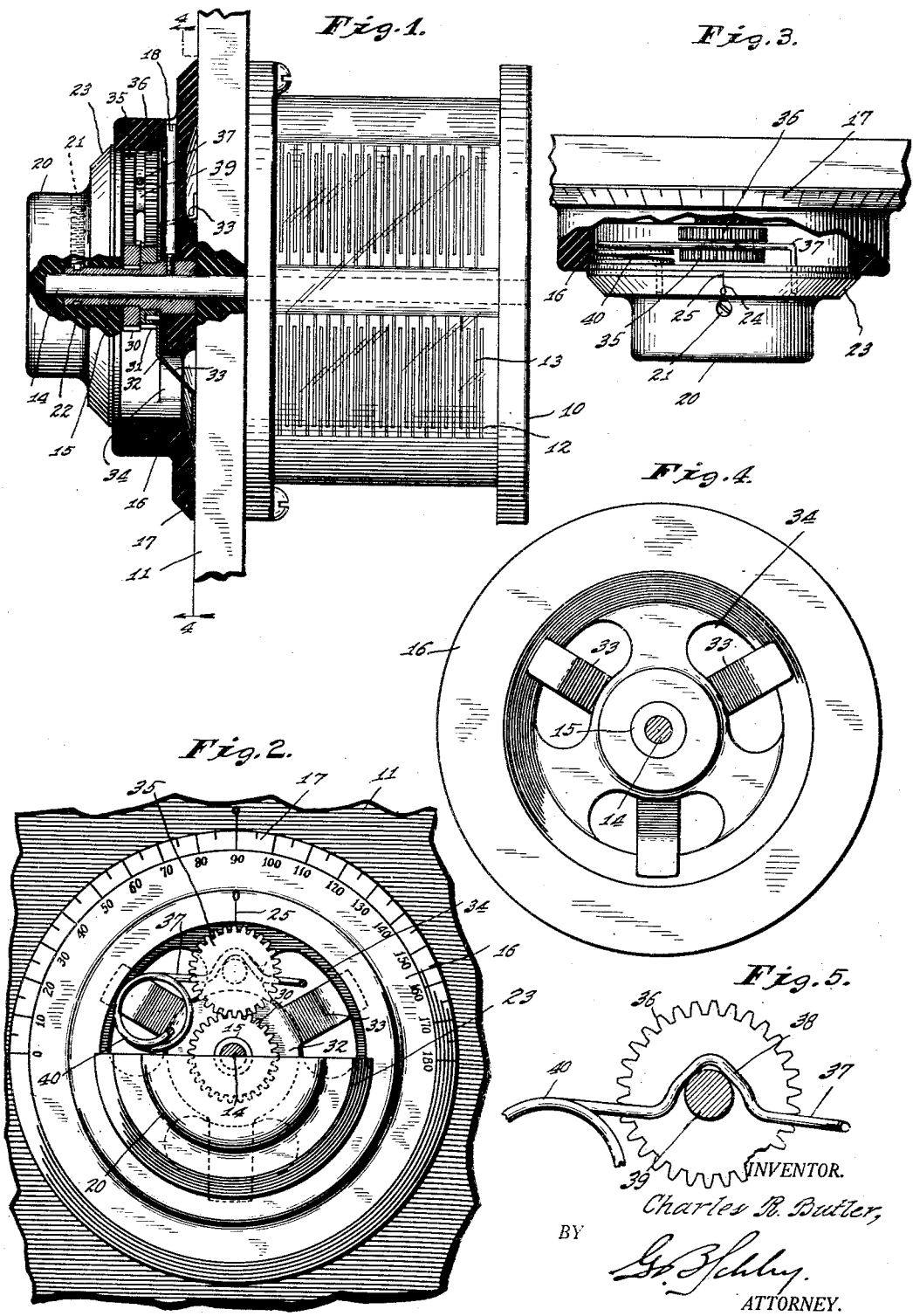

Patented Feb. 17, 1931

1,793,051

UNITED STATES PATENT OFFICE

CHARLES R. BUTLER, OF INDIANAPOLIS, INDIANA

MICROADJUSTING DEVICE

Application filed October 11, 1922. Serial No. 593,888.

In certain classes of apparatus, it is necessary that fine final adjustments be made, after preliminary coarse adjustments. This is especially the case in certain devices used in radio receiving stations, as for instance in the adjustment of variable condensers and variable couplers. For instance, in adjusting a variable condenser, the receiving circuit is in some cases thrown out of tune merely by the removal of the operator's hand from the adjusting mechanism; while in others the operator is totally unable to get slight enough movements of his condenser with the ordinary adjusting knob to tune his receiving circuit to pick out some desired one of a number of stations sending simultaneously on wave-lengths very closely alike.

It is the object of my present invention to provide a simple and effective adjusting device for readily getting both coarse and fine adjustments, with a very slight variation in the position of the operator's hand to change from one to the other; and to get both adjustments materially without lost-motion in the operating mechanism, and by concentric operating parts, and by a device which is inexpensive to manufacture and install and is not liable to derangement in operation.

In carrying out my invention, I provide two concentric adjusting members, one of which is fixed upon or otherwise connected to the shaft of the device to be adjusted and has fixed thereto a sun gear, and the other of which carries two planet gears of slightly different size which mesh respectively with the aforesaid sun gear and with a second co-axial sun gear of suitable size but relatively to which the sun gear is movable; and I preferably provide the second sun gear with a friction connection to a stationary part so that it may turn with the first sun gear upon adjustment by one adjusting member which will be frictionally held from tuning upon adjustment by the other adjusting member; and I mount the planet gears on the second adjusting member by a resilient mounting which always presses them into mesh with their respectively associated sun gears, so that substantially all lost-motion in the device will be eliminated.

I have illustrated my invention in connection with a variable condenser, for use with which it was especially designed and is especially applicable; but my adjusting mechanism is capable of many other uses, and the showing of it in connection with a variable condenser is merely illustrative of one of its uses.

The accompanying drawing illustrates my invention: Fig. 1 is a side elevation, in partial section, on my adjusting device, in connection with a variable condenser and a fragment of the panel of a radio receiving set; Fig. 2 is a front elevation of the adjusting device shown in Fig. 1, with the upper half of the main operating dial cut away in order better to show the working parts behind it; Fig. 3 is a fragmentary plan, in partial section, of the panel board and adjusting mechanism shown in Fig. 1; Fig. 4 is a section on the line 4—4 of Fig. 1, showing the adjusting mechanism of Fig. 1 in elevation with the shaft of the variable condenser in section; and Fig. 5 is an enlarged detail of the mounting of the planet gears.

The variable condenser 10, in connection with which I have shown my invention by way of example, is usually mounted on the rear of a panel board 11, and has the usual fixed condenser plates 12 and movable condenser-plates 13 which are arranged in alternating planes in the usual manner and overlap to a greater or less extent in accordance with the position of the shaft 14 which carries such movable plates 13. This shaft 14, which is illustrative of any shaft for which coarse and fine adjustments are desired, projects forward through the panel board 11, and is adjusted by my adjusting device.

Fixed on the forwardly projecting end of this shaft 14 is a sleeve 15, to which is fixed a main adjusting dial 16 having a suitably marked peripheral flange 17 lying close to the panel board 11. The markings on the flange 17 are usually in degrees, to indicate by reference to a zero mark on the panel board the position of the movable condenser plates 13 or other device carried by the shaft 14. Conveniently, a single clamping screw 18 fastens the main adjusting dial 16, the sleeve 15, and the shaft 14 all together. Manual movement of the main adjusting dial 16 causes coarse adjustment of the controlled device.

The fine adjustment of the controlled device is obtained by a smaller adjusting knob 20 rotatably mounted on the shaft 14 and sleeve 15 but held from axial movement therealong by a set-screw 21 which projects into a circumferential groove 22 in the sleeve 15 near its outer end. The knob 20 and dial 16 are thus concentric, and the knob 20 is slightly smaller than the dial 16, so that the operator may shift his fingers from one to the other with a minimum of effort and care. The knob 20 has an outwardly projecting flange 23 which closes the outer end of the space within the hollow dial 16; and such flange 23 and the front face of the dial 16 have suitable cooperating indicating markings 24 and 25 for indicating their relative position.

The sleeve 15 is shouldered to provide two portions of different diameter for receiving two sun gears 30 and 31. The forward sun gear 30 is fixed on the sleeve 15, and therefore on the shaft 14; but the sun gear 31 is loose on the sleeve 15 and therefore on the shaft 14, but is held in axial position between the sun gear 30 and a suitable shoulder on the sleeve 15. The sun gear 30 is very slightly larger than the sun gear 31, as is clear from Fig. 1, the difference being only one tooth when very fine adjustments are desired. The sun gear 31 is fixed to a spring plate 32 which has spring fingers 33 which project through holes 34 in the base of the main adjusting dial 16 and bear resiliently against the front face of the panel board 11. The spring pressure of the fingers 33 against the panel board tends to hold the sun gear 31 from moving, but is not sufficient to prevent the sun gear from moving when the main adjusting dial 16 is turned.

Meshing with the sun gears 30 and 31 are two planet gears 35 and 36 respectively. These two planet gears are rigid with each other, and preferably integral with each other; and the planet gear 35 is smaller than the planet gear 36 by the same amount that the sun gear 30 is larger than the sun gear 31. The planet gears 35 and 36 are eccentric to the small adjusting knob 20, and rotate with such small adjusting knob. However, they do not have a rigid mounting in such small adjusting knob, but instead are spring-mounted thereon, so that their teeth are constantly spring-pressed into mesh with their respectively associated sun gears. This spring mounting preferably consists of a spring wire 37 which has its ends projected into holes in the rear face of the small knob 20 (as is clear from Fig. 3) and between its ends is bent into a V-shaped crotch 38 which is received in a circumferential groove separating the two planet gears 35 and 36 and presses against a small-diameter connecting portion 39 connecting said two planet gears. By reason of having the crotch 38 in the shape of a V, it engages the connecting portion 39 at two points on opposite sides of the radial line between said connecting portion 39 and the shaft 14, so that not only does the spring wire 37 force the planet gears toward the sun gears but also acts as a driving member to cause the axis of the planet gears to travel around the axis of the shaft 14 with the small adjusting knob 20. For greater resiliency, the spring wire 37 is preferably bent on at least one side of the crotch 38 into a multi-turn coil 40.

In operation, the operator grasps the main operating dial 16 and turns it for coarse adjustments of his variable condenser or other device to be adjusted. This action directly turns the shaft 14, through the same angle as the dial 16 is turned, and carries the small adjusting knob 20 with it unless the latter is held. In this movement, the spring fingers 33 slip on the face of the panel board 11.

When approximately the desired adjustment has been obtained, by this coarse adjustment, the operator slips his fingers from the main adjusting dial 16 to the small knob 20; which he can readily do with a minimum of effort and care, and without finding it necessary even to look at the adjusting device. Then he turns the small knob 20 for the fine adjustment. He turns the small knob 20 in the same direction as the main adjusting dial 16 for adjustments in the same sense; but by reason of the reduction gearing within the main adjusting dial 16 the shaft 14 is moved through only a small fraction of the angle through which the small adjusting knob 20 is turned.

This reducing gearing acts in this way: When the small adjusting knob 20 is turned, it acts through the spring wire 37 to cause the planet gears 35 and 36 to roll around the sun gears 30 and 31. The sun gear 31 is held stationary at this time, however, by the spring pressure of the spring fingers 33 on the face of the panel board 11; so that because of the slight difference in the size of the sun gears 30 and 31 the sun gear 30 is made to progress angularly in the same direction as the operating knob 20 is turned, but through a much smaller angle. The turning of the sun gear 30 carries the shaft 14 and the movable plates 13 with it. In this way, very delicate movements of the movable condenser plates 13 may be obtained by comparatively coarse movements of the adjusting knob 20— so that much finer adjustments of such movable plates can be obtained than is possible by the direct operation of the main operating dial 16. The adjustment of the shaft 14 by the small operating knob 20, however, produces a movement of the main operating dial 16 and its indicating flange 17 through the same angle as the shaft 14 and movable condenser plates 13 are moved, so that the scale on the edge of the flange 17 always indicates the correct position of the device regardless of whether the adjustment is made by the main operating dial or by the fine-adjustment knob.

Because of the action of the spring wire 37 in always pressing the planet gears into mesh with the sun gears, substantially all back-lash is eliminated. In consequence, it is not only possible to obtain a fine adjustment by slight movements of the small knob 20 in first one direction and then the other as desired, but in addition an adjustment once obtained is preserved against accidental disturbance by jarring, because of the action of the spring fingers 33 in frictionally holding the parts in place.

Further, if in the adjustment by the small knob 20 the limit of fine adjustment is reached, by the engagement of the spring fingers 33 against one end or the other of the slots 34 through which they project, the operator may nevertheless readily proceed with his adjustment in any of the following manners: first, he may continue to turn the shaft 14 in the same direction by either the knob 20 or the main dial 16, (both of which produce the same effect in this condition because of the inter-engagement of the spring fingers 33 with the ends of the slots 34), until a slight over-adjustment is obtained, and then turn his small knob 20 backward to get his fine adjustment; or second, he may hold the small knob 20 stationary (as by a thumb and fore finger) while he turns the main operating dial 16 in the desired direction (as by fingers of the same hand), which serves the double purpose of getting the desired coarse adjustment and of restoring to a greater or less extent the relation of the small adjusting knob 20 to the main operating dial 16 to permit a further fine adjustment by said small operating knob; or third, he may first move the small knob 20 backward, say to zero holding the main adjusting dial 16 while doing so if desired so that the spring fingers 33 will slip on the panel board, and then move the main adjusting dial 16 forward to a more accurate coarse adjustment, and then get the fine adjustment by moving the knob 20 in either direction as required.

I claim as my invention:

1. In combination, an operating shaft for an adjustable device, an adjusting member fixed on said shaft for adjusting it, a second adjusting member, and speed-reducing gearing positively interconnecting said second and first adjusting members, said speed-reducing gearing including two pairs of intermeshing gears, one of each pair of intermeshing gears in said gearing being spring-pressed toward its intermeshing gear to prevent back-lash.

2. In combination, an operating shaft for an adjustable device, an adjusting member fixed on said shaft for adjusting it, a sun gear fixed on said shaft, a second sun gear co-axial with but loose on said shaft and of different size from the first sun gear, a stationary member with which said second sun gear has a permanent friction-brake connection at one or more points spaced a considerable distance from said shaft, a second adjusting member co-axial with but loose on said shaft, and two interconnected planet gears of different size carried by said second adjusting member and meshing with said two sun gears.

3. In combination, an operating shaft for an adjustable device, an adjusting member fixed on said shaft for adjusting it, a sun gear fixed on said shaft, a second sun gear co-axial with but loose on said shaft and of different size from the first sun gear, a stationary member with which said second sun gear has a friction-brake connection, a second adjusting member co-axial with but loose on said shaft, and two interconnected planet gears of different size carried by said second adjusting member and meshing with said two sun gears, said two planet gears being spring-pressed toward their associated sun gears to prevent back-lash.

4. In combination, an operating shaft for an adjustable device, an adjusting member fixed on said shaft for adjusting it, a sun gear fixed on said shaft, a second sun-gear co-axial with but loose on said shaft and of different size from the first sun gear, a second adjusting member co-axial with but loose on said shaft, and two interconnected planet gears of different size carried by said second adjusting member and meshing with said two sun gears, said two planet gears being spring-pressed toward their associated sun gears to prevent back-lash.

5. In combination, an operating shaft for an adjustable device, an adjusting member fixed on said shaft for adjusting it, a sun gear fixed on said shaft, a second sun-gear co-axial with but loose on said shaft and of different size from the first sun gear, a second adjusting member co-axial with but loose on said shaft, and two interconnected planet gears of different size carried by said second adjusting member and meshing with said two sun gears, and permanently operated means tending to hold said second sun gear from movement but capable of preventing movement of said second sun gear when said shaft is rotated by the adjusting member fixed on it.

6. In combination, an operating shaft for an adjustable device, an adjusting member fixed on said shaft for adjusting it, a sun gear fixed on said shaft, a second sun gear co-axial with but loose on said shaft and of different size from the first sun gear, a second adjusting member co-axial with but loose on said shaft, and two interconnected planet gears of different size carried by said second adjusting member and meshing with said two sun gears, said two planet gears being spring-pressed toward their associated sun gears to prevent back-lash, and means for holding said second sun gear from movement when the second adjusting member is manipulated while permitting it to move when the first adjusting member is manipulated.

7. In combination, an operating shaft for an adjustable device, two rotatable adjusting members for imparting respectively coarse and fine adjustments to said shaft, a speed-reducing connection interconnecting said two adjusting members, a stationary member, and a friction-brake member which engages said stationary member with constant pressure, which slides over such stationary member when the coarse adjusting member is operated, and against which said speed-reducing connection reacts.

8. In combination, an operating shaft for an adjustable device, an adjusting member fixed on said shaft for adjusting it, a sun gear fixed on said shaft, a second sun gear co-axial with but loose on said shaft and of different size from the first sun gear, a stationary member, a part rigid with said second sun gear and frictionally engaging said stationary member with axial pressure, a second adjusting member co-axial with but loose on said shaft, and two interconnected planet gears of different size carried by said second adjusting member and meshing with said two sun gears.

9. In combination, an operating shaft for an adjustable device, a panel through which said shaft extends, an adjusting device concentric with said shaft but relatively circumferentially movable, a member rotatable relatively to said shaft and engaging said panel frictionally with axial pressure, and means actuated by the turning of said adjusting device and acting between said shaft and said rotatable member to turn said shaft at a reduced speed when said adjusting device is turned.

10. In combination, an operating shaft for an adjustable device, two adjusting members therefor co-axial with each other and rotatable relatively to each other, a panel through which said shaft extends, a rotatable member frictionally engaging said panel with axial pressure and rotatable relatively to said two adjusting members, and a speed-reducing connection interconnecting one of said two adjusting members to the other and reacting against said rotatable member.

In witness whereof, I have hereunto set my hand at Indianapolis, Indiana, this ninth day of October, A. D. one thousand nine hundred and twenty-two.

CHARLES R. BUTLER.